United States Patent

George et al.

[15] 3,707,331

[45] Dec. 26, 1972

[54] CONCENTRATION DIFFERENCE CELL

[72] Inventors: Kenyon P. George, Arcadia; Roland C. Hawes, Monrovia, both of Calif.

[73] Assignee: Cary Instruments, Monrovia, Calif.

[22] Filed: March 29, 1971

[21] Appl. No.: 129,031

[52] U.S. Cl.................356/246, 250/43.5 R, 250/218
[51] Int. Cl..........................G01n 1/10, G01n 21/24
[58] Field of Search............250/43.5 R, 218; 356/246

[56] References Cited

UNITED STATES PATENTS

| | | | |
|---|---|---|---|
| 2,805,339 | 9/1957 | Laird | 356/246 UX |
| 2,992,077 | 7/1961 | Schneider et al. | 356/246 X |
| 3,090,861 | 5/1963 | Haenni | 356/246 X |
| 3,560,077 | 2/1971 | Sooy et al. | 356/246 |

*Primary Examiner*—Ronald L. Wibert
*Assistant Examiner*—Orville B. Chew, II
*Attorney*—White, Haefliger & Bachand

[57] ABSTRACT

A concentration difference cell adapted for use with spectrophotometer apparatus producing a light beam, the cell comprises:

a. first and second chambers including windows located to pass the beam transmitted successively through the chambers, b. said chambers having associated beam path dimensions, the beam path dimension of the first chamber being adapted to increase while the beam path dimension of the second chamber decreases and in response to movement of at least one window, whereby the volume of the first chamber remains proportional to the increase in the beam path dimension of the first chamber, and the sum of the beam path dimensions of the first and second chambers remains constant, c. the chambers arranged in such relation that a predetermined quantity of a first liquid in the first chamber may be diluted by introduction into the first chamber of a quantity of auxiliary liquid accompanied by movement of said one window toward the second chamber containing second liquid, the refractive index of the liquid in the first chamber being kept substantially equal to the refractive index of the second liquid so long as said beam path dimension of the first chamber is an appreciable part of said sum.

20 Claims, 5 Drawing Figures

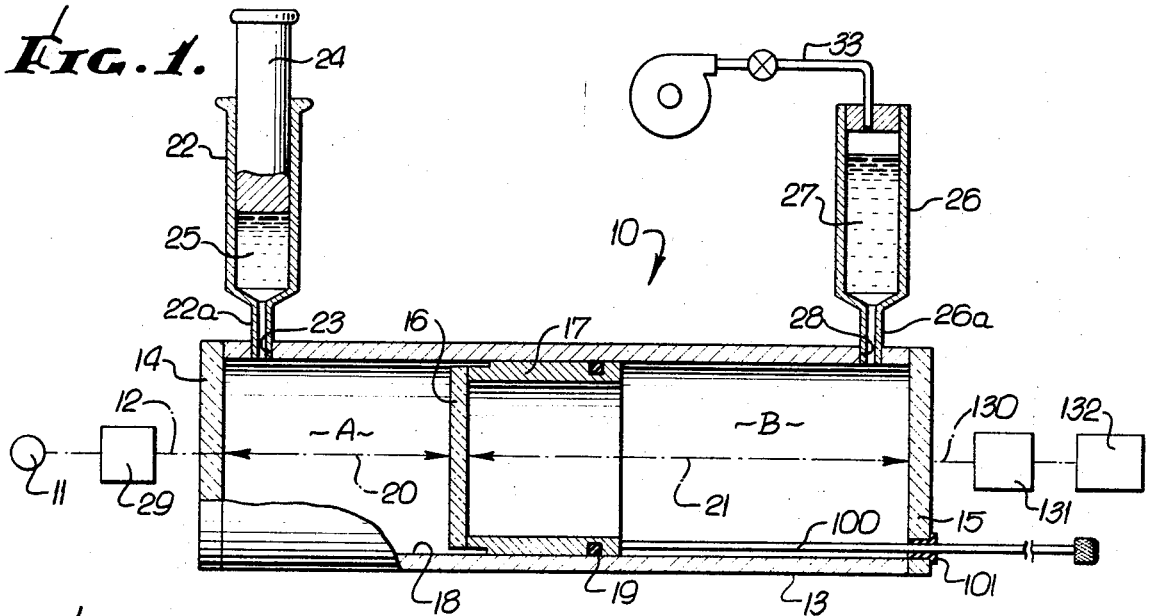
Fig. 1.
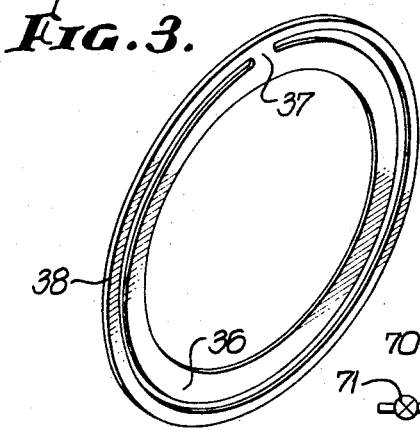
Fig. 3.
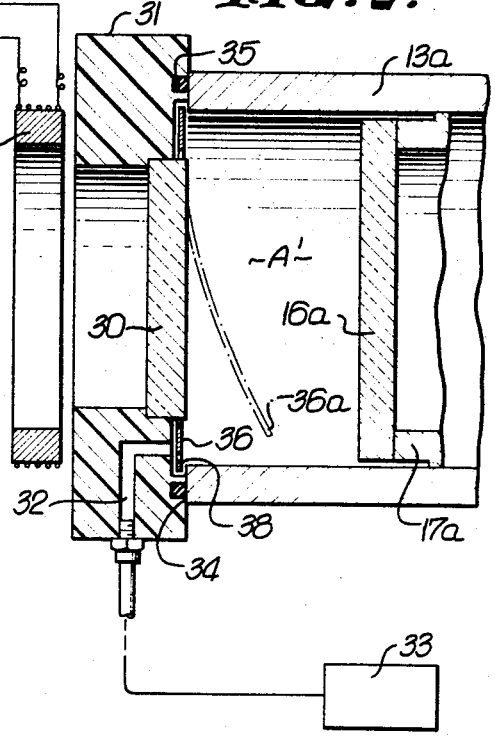
Fig. 2.
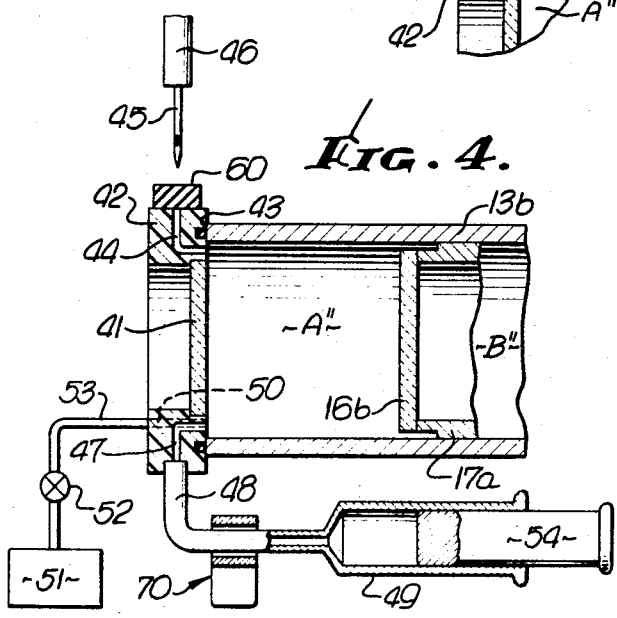
Fig. 5.
Fig. 4.
INVENTORS.
ROLAND C. HAWES
KENYON P. GEORGE
By White, Haefliger & Bachand
ATTORNEYS.

CONCENTRATION DIFFERENCE CELL

BACKGROUND OF THE INVENTION

This invention relates generally to optical absorption, and more particularly concerns apparatus usable to measure the effect on optical absorption of changes in the concentration of a liquid sample.

Optical absorption measurement techniques normally involve passing electromagnetic radiation through an absorption cell containing liquid consisting of a sample and a solvent. It is in certain instances desired to measure the effect on optical absorption of a change in the concentration of the liquid sample in the solvent. Such measurements can be made most sensitively if the change in concentration is exactly compensated by an equal and opposite change in optical path length, without changing other parameters such as refractive index, optical beam geometry, or cell window geometry. The Lambert-Beer equation states:

$$T = 10^{(-abc)} \qquad (1)$$

or $$A = abc \qquad (2)$$

where:

$T$ is the optical transmittance $A$ is the optical absorbance, $a$ is the absorptivity of the substance in the absorption cell, $b$ is the optical path length in the absorption cell, and $c$ is the sample concentration.

From equation (2) it appears that if $b$ is varied inversely when $c$ is changed, any shift in $A$ reflects a change in absorptivity due to dissociation or association, or solvent-solute interaction. While these effects are small, they do reveal important information about the nature of solvation, binding and the intimate environment of the chromophore groups of the absorbing molecules.

SUMMARY OF THE INVENTION

It is a major object of the invention to provide unusually advantageous means enabling observation of such changes in absorptivity as differences, the measurements then being independent of photometer linearity and of other possible measurement errors. Basically, the invention is exemplified in a concentration difference cell adapted for use with spectrophotometer apparatus producing a light beam, the cell comprising: first and second chambers including windows located to pass the beam transmitted successively through the chambers; the chambers having associated beam path dimensions with that of the first chamber adapted to increase while the beam path dimension of the second chamber decreases and in response to movement of at least one window, whereby the volume of the first chamber remains proportional to the increase in the beam path dimension of the first chamber, and the sum of the beam path dimensions of the two chambers remaining constant. The chambers are arranged in such relation that a predetermined quantity of a first liquid in the first chamber may be diluted by introduction into that chamber of a quantity of auxiliary liquid accompanied by movement of said one window toward the second chamber containing second liquid. Further, the refractive index of the liquid in the first chamber is typically kept substantially equal to the refractive index of the second liquid so long as the beam path dimension of the first chamber is an appreciable part of the sum of the two beam path dimensions. Thus, the change in concentration of the solute is exactly compensated by the simultaneous change in pathlength.

Additional objects and advantages include the provision of supply means to supply auxiliary liquid to the first chamber; the provision of chambers in the form of a tubular body and three windows spaced lengthwise thereof, one window intermediate the other two being movable lengthwise of the body to effect chamber volume increase and decrease, and so that the windows remain in the optical path throughout the measurement; and the provision for mixing of liquid in the first chamber or externally thereof.

It is further object to provide in spectrophotometry wherein a light beam is transmitted through chambers via windows therein, an unusually advantageous method of changing the concentration of a predetermined quantity of first liquid in a first chamber that has a first beam path dimension, and that includes: maintaining second liquid in the second chamber; and introducing into the first chamber a quantity of auxiliary liquid and also increasing the volume of the first chamber in response to movement of one window toward the second chamber so that the first beam path dimension is substantially proportional to such increase in volume, such auxiliary liquid introduction being effected while maintaining constant the sum of the beam path dimensions through the chambers.

These and other objects and advantages of the invention, as well as the details of an illustrative embodiment, will be more fully understood from the following specification and drawings, in which:

DRAWING DESCRIPTION

FIG. 1 is a side elevation taken in section to show one form of cell;

FIG. 2 is a fragmentary side elevation showing a modified cell construction;

FIG. 3 is a perspective showing of a stirring device seen in FIG. 2;

FIG. 4 is a fragmentary side elevation illustrating still another cell construction; and FIG. 5 is a fragmentary view of further modified cell construction.

DETAILED DESCRIPTION

Referring first to FIG. 1, the illustrated concentration difference cell 10 comprises first and second chambers including windows to pass a light beam 12 from source 11 for transmission successively through the chambers. Such chambers may be as indicated by the letters A and B, and formed by tubular body 13 and windows 14 and 15 attached to opposite ends of the body. A third window 16 is confined within the body and is mounted on a tubular part or sleeve 17 of an outside diameter slightly smaller than the bore 18 of the body 13, so that the sleeve can be easily moved along that bore. If desired, an O-ring seal 19 may be carried by the sleeve to engage bore 18 and seal against liquid leakage between the chambers A and B. A pusher 100 may extend through a seal 101 in window 15, to displace sleeve 17.

The two chambers have beam path dimensions 20 and 21, as shown, the path dimension 20 of the first chamber A being adapted to increase, at the same time that the path dimension 21 of the second chamber B decreases (in response to rightward sliding of the sleeve 17, for example); however, the sum of dimensions 20 and 21 remains constant. In the specific example, the volumes of the chambers A and B are respectively increased and decreased although chamber B could be constructed so that its volume remained constant. Further, the chambers are sized so that a predetermined quantity of a first liquid in the first chamber A (as for example filling that chamber) may be diluted by introduction into the first chamber of a quantity of auxiliary liquid equal in volume to the decrease in volume of the second chamber B containing the second liquid. The auxiliary liquid may for example consist of the same liquid as is in the second chamber.

Also provided is supply means to supply the referred to quantity of auxiliary liquid to the first chamber, such supply means for example including a reservoir 22 communicating with the chamber A via a neck 22a and an opening 23 in the body 13 removably receiving the neck. A close fitting plunger 24 is movable in the reservoir tube bore to decrease the size of the reservoir, urging liquid 25 into chamber A, with the result that the window 16 and sleeve 17 are urged to the right in bore 18. A second reservoir 26 for the second liquid 27 communicates via neck 26a and opening 28 in the tube with the second chamber B, whereby liquid displaced from the chamber B may rise in the reservoir 26. Reservoirs 22 and 26 are removably attached to body 13.

In use, the cell 10 is placed in the light beam 12 of spectrophotometer, block 29 indicating associated optics as may for example include a monochromator. Light emanating from the cell at 30 passes to a photodetector 31 the output of which is amplified or otherwise suitably processed, and recorded or indicated at 32. Window 16 is displaced to the left (as by pumping second liquid such as solvent at 33 into the reservoir 27 for pressure flow into the chamber B) until it is in contact with window 14, thereby reducing optical path length 20 to zero, and the volume of chamber A to near zero.

Next, a small amount of a sample liquid is placed in empty reservoir 22 and forced into chamber A, causing window 16 and sleeve 17 to be displaced to the right for a short distance, the resultant optical path length 20 being then substantially smaller than path length dimension 21. An optical measurement is then made. Reservoir 22 is then removed and rinsed, and subsequently filled with solvent, as for example the same liquid as contained in volume B. Plunger 24 is then operated to displace a measured amount of this solvent into chamber A, thereby displacing window 16 to the right. After the sample and solvent introduced into chamber A have become thoroughly mixed, another optical measurement is made. This process is continued until sleeve 17 is displaced close to window 15. The refractive index of the liquid in chamber A should be kept substantially equal to that of liquid 27 so long as the beam path dimension 20 is an appreciable part of the sum of dimensions 20 and 21.

It will be noted that during each of these measurements, windows 14, 15 and 16 have remained in the optical path throughout the measurement. Also, the sum of the beam path dimensions 20 and 21 remains constant.

FIG. 2 shows a somewhat different arrangement of the left end portion of the cell, and embodying mixing means to effect mixing of liquid in the first chamber A'. In the illustration, the window 30, which may consist of quartz, is mounted by a ring shaped holder 31, which may, for example, consist of an inert, insoluable plastic material such as Teflon. The holder also contains a port 32 through which liquid is communicated to the chamber A', as from reservoir 33. Holder 31 may be suitably retained against the end face 34 of body 13a, an annular seal 35 being carried by the holder to seal off against that face.

The mixing means in FIGS. 2 and 3 takes the form of a thin, annular magnetic field responsive pate 36 connected by web 37 with an outer annulus 38. The latter is retained between the holder and the end face 34, as shown, whereby the plate 36 may flex between full and broken line positions 36 and 36a. Such flexing may be induced by a pulsating magnetic field generated, for example, by solenoid ring 39 adjacent the holder and supplied with AC current from source 40, whereby the plate 36 rapidly flexes back and forth to stir the contents of the chamber A'. Structure 36–38 may be suitably coated with inert material such as Teflon.

In the modification shown in FIG. 4, window 41 is mounted in ring-shaped plastic holder 42 clamped against the end 43 of tubular body 13b. L-shaped passage 44 in the holder communicates between the chamber A'' and a rubber septum or seal 60 suitably connected to the holder as by bonding or clamping. The sample is introduced to chamber A'' by puncturing the septum with a hypodermic needle 45 and injecting the sample from a hypodermic syringe 46.

Another L-shaped port 47 in the holder 42 communicates between flexible tubing 48 and the chamber A'', that tubing in turn communicating with hypodermic syringe 49. A third passageway 50 in the holder 42 communicates between a solvent reservoir 51 (via a valve 52 in duct 53) and the chamber A''.

In operation, all passageways 44, 47 and 50 are filled with solvent to avoid or eliminate air bubbles. Next, the solvent valve 52 is opened, and the plunger 54 in syringe 49 is inserted as far as possible in order to minimize dead volume, the surplus solvent being exhausted to the reservoir 51, and the valve 52 is closed, after window 16b is brought into contact with window 41.

The sample is then introduced from needle 45 into the chamber A'', and the first optical measurement is made. The valve 52 is then opened and a measured amount of solvent introduced from reservoir 51 into chamber A'', after which valve 52 is closed. Part of the contents of chamber A'' is then withdrawn into syringe 49 by retracting plunger 54, and the withdrawn liquid is then vigorously reinjected into chamber A'' in order to effect mixing. This process is repeated until sample and solvent in the chamber A'' are thoroughly mixed, and in this regard the degree of mixing can be monitored by means of the optical beam and detection thereof. Tubing 48 is then clamped as by means 70 to close off the syringe 49, and the optical measurement again made. This process can be repeated for each new introduction of solvent.

In FIG. 5, the cell construction is the same as in FIG. 4, with the addition of a side passage 70 valve controlled at 71. When liquid is withdrawn by the mixing syringe, as described, gas enters the first chamber A'' via passages 70 and 44, making it unnecessary for the window 16b and cylinder 17a to move during mixing of the withdrawn liquid. The gas is subsequently expelled via these passages when the liquid is reintroduced.

Merely as illustrative, aggregations of protein subunits in hemoglobin samples may be studied in this manner, to measure dissociation of the hemoglobin molecule. A suitable solvent for such a sample may consist of saline solution. Other fluids may be used for the referred to liquids.

We claim:

1. A concentration difference cell adapted for use with spectrophotometer apparatus with an associated light beam, the cell comprising
   a. first and second chambers including windows located to pass the beam transmitted successively through the chambers,
   b. said chambers having associated beam path dimensions, the beam path dimension of the first chamber being adapted to increase while the beam path dimension of the second chamber decreases and in response to movement of at least one window, whereby the volume of the first chamber remains proportional to the increase in the beam path dimension of the first chamber, and the sum of the beam path dimensions of the first and second chambers remains constant,
   c. the chambers arranged in such relation that a predetermined quantity of a first liquid in the first chamber is diluted by introduction into the first chamber of a quantity of auxiliary liquid accompanied by movement of said one window toward the second chamber containing second liquid, the refractive index of the liquid in the first chamber being kept substantially equal to the refractive index of the second liquid so long as said beam path dimension of the first chamber is an appreciable part of said sum, and supply means for supplying said predetermined quantity of said first liquid to the first chamber and including a reservoir to supply said auxiliary liquid to the first chamber to progressively decrease the concentration of said first liquid in the first chamber as the beam path dimension of the first chamber increases.

2. The cell of claim 1 including a plunger movable to decrease the size of said reservoir and to force the auxiliary liquid into the first chamber.

3. The cell of claim 1 wherein said chambers are defined by a tubular body and three windows spaced lengthwise thereof, said one window being intermediate the other two and movable lengthwise of the body.

4. The cell of claim 3 including a tubular part mounting said one window and having closely fitting relation with the bore of said tubular body, said part being slidable lengthwise of said body in response to pressurized supply of said auxiliary liquid to said first chamber.

5. The cell of claim 2 including another reservoir for said second liquid communicating with said second chamber to facilitate filling the second chamber.

6. The cell of claim 1 including mixing means to effect mixing of liquid in the first chamber.

7. The cell of claim 6 wherein said mixing means comprises an element movable in the first chamber in response to application thereto of a varying magnetic field.

8. The cell of claim 1 including means to withdraw first and auxiliary liquid from the first chamber and to re-supply the withdrawn and mixed liquid to said first chamber.

9. The cell of claim 8 wherein said last named means comprises a syringe in communication with said first chamber.

10. The cell of claim 8 including a passage to admit gas to the first chamber during withdrawal of said first and auxiliary liquid therefrom.

11. A concentration difference cell in combination with spectrophotometer apparatus producing a light beam, the cell comprising
   a. first and second chambers including windows passing the beam transmitted successively through the chambers,
   b. said chambers having associated beam path dimensions, the beam path dimension of the first chamber being adapted to increase while the beam path dimension of the second chamber decreases and in response to movement of at least one window, whereby the volume of the first chamber remains proportional to the increase in the beam path dimension of the first chamber, and the sum of the beam path dimensions of the first and second chambers remains constant,
   c. the chambers arranged in such relation that a predetermined quantity of a first liquid in the first chamber is diluted by introduction into the first chamber of a quantity of auxiliary liquid accompanied by movement of said one window toward the second chamber containing second liquid, the refractive index of the liquid in the first chamber being kept substantially equal to the refractive index of the second liquid so long as said beam path dimension of the first chamber is an appreciable part of said sum.

12. In spectrophotometry wherein a light beam is transmitted through chambers via windows therein, the method of changing the concentration of a predetermined quantity of first liquid in a first chamber that has a first beam path dimension, and that includes
   a. maintaining second liquid in the second chamber, and
   b. introducing into the first chamber a quantity of auxiliary liquid and also increasing the volume of the first chamber in response to movement of one window toward the second chamber, so that the first beam path dimension is substantially proportional to said increase in volume,
   c. said introduction being effected while maintaining constant the sum of the beam path dimensions through the chambers.

13. The method of claim 12 which includes mixing the first and auxiliary liquids.

14. The method of claim 13 wherein said mixing is effected within the first chamber.

15. The method of claim 13 wherein said mixing is effected externally of the first chamber.

16. The method of claim 12 wherein said volume of the first chamber is increased simultaneously with decrease in volume of the second chamber.

17. The method of claim 12 wherein said second and auxiliary liquids are the same.

18. The method of claim 12 including passing said beam through said chambers at different stages of the first chamber volume increase.

19. The method of claim 12 wherein the first liquid consists of hemoglobin in a saline solvent.

20. The method of claim 13 wherein said mixing is effected during movement of the first and auxiliary liquids between the first chamber and the exterior thereof.

* * * * *